(12) United States Patent
Russi

(10) Patent No.: US 8,507,025 B2
(45) Date of Patent: Aug. 13, 2013

(54) ENERGY SUPPLEMENT FOR RUMINANT ANIMALS

(75) Inventor: Juan Pablo Russi, Buenos Aires (AR)

(73) Assignee: Rupca, LLC, Merced, CA (US)

( * ) Notice: Subject to any disclaimer, the term of this patent is extended or adjusted under 35 U.S.C. 154(b) by 248 days.

(21) Appl. No.: 13/022,046

(22) Filed: Feb. 7, 2011

(65) Prior Publication Data

US 2011/0195146 A1 Aug. 11, 2011

Related U.S. Application Data

(60) Provisional application No. 61/301,935, filed on Feb. 5, 2010.

(51) Int. Cl.
*A23L 1/0562* (2006.01)
*A23L 1/09* (2006.01)

(52) U.S. Cl.
USPC .............. 426/623; 426/2; 426/502; 426/624; 426/656; 426/657; 426/807

(58) Field of Classification Search
USPC .............. 426/2, 623, 624, 658, 656, 657, 520
See application file for complete search history.

(56) References Cited

U.S. PATENT DOCUMENTS

| | | | |
|---|---|---|---|
| 4,957,748 A | 9/1990 | Winowiski | |
| 5,023,091 A | 6/1991 | Winowiski | |
| 5,789,001 A | 8/1998 | Klopfenstein et al. | |
| 6,221,380 B1 * | 4/2001 | Woodroofe et al. | 424/438 |
| 6,322,827 B1 | 11/2001 | Scott et al. | |
| 6,506,423 B2 | 1/2003 | Drouillard et al. | |
| 7,303,775 B1 | 12/2007 | Patton et al. | |
| 2006/0039955 A1 * | 2/2006 | Messman et al. | 424/442 |
| 2009/0196949 A1 | 8/2009 | Winowiski | |

FOREIGN PATENT DOCUMENTS

WO 2005025323 A1 3/2005

OTHER PUBLICATIONS

Drackley, J. K. "Biology of Dairy Cows During the Transition Period: the Final Frontier?" Journal of Dairy Science 82 (11):2259-2273. (1999).
Bell, A. W. "Regulation of organic nutrient metabolism during transition from late pregnancy to early lactation". J Anim Sci 73: 2804-2819. (1999).
Drackley, et al. "Adaptations of Glucose and Long-Chain Fatty Acid Metabolism • in Liver of Dairy Cows During the Periparturient Period". Journal of Dairy Science 84(E. Suppl.):E100-E112. (2001).
Wheelock, et al. "Effects of heat stress on energetic metabolism in lactating Holstein cows". Journal of Dairy Science 93(2): 644-655. (2010).

* cited by examiner

*Primary Examiner* — Helen F Heggestad
(74) *Attorney, Agent, or Firm* — Fox Rothschild LLP; Peter J. Butch, III; Nancy Halpern

(57) ABSTRACT

A method of preparing rumen-protected carbohydrates for use in ruminant feeds by inducing the Maillard reaction between a reducing carbohydrate source and a protein source. Products made by the process and methods for maintaining or restoring blood glucose levels within the normal reference range for ruminants, especially during transition or under heat stress are also disclosed.

20 Claims, 3 Drawing Sheets

ENERGY SUPPLEMENT FOR RUMINANT ANIMALS

CROSS-REFERENCE TO RELATED APPLICATIONS

This application claims priority under 35 U.S.C. §119(e) to U.S. Provisional Application Ser. No. 61/301,935 filed Feb. 5, 2010, which is incorporated by reference in its entirety.

FIELD OF THE INVENTION

The present invention relates to providing ruminant animals a source of high quality rumen-protected carbohydrates in the small intestine, for example during the transition period, and/or during heat stress to increase the ruminant's glucose supply and maintain high milk yield, health and reproduction.

BACKGROUND OF THE INVENTION

It is known that during the transition period, which is three weeks before and three weeks after calving, ruminants experience a decrease in glucose levels, with the blood glucose level of cows being particularly low compared to other ruminants. During the transition period, the plasma glucose level drops from 60 to 70 mg/dl to about 45 mg/dl. Moreover, in the first few days after parturition, liver glycogen is depleted (Vasquez-Anon et al., J. Dairy Sci. 77(6):1521-1528).

Studies have also shown that heat-stressed ruminants experience an increase in glucose demands in skeletal muscle and cerebral metabolism. While heat-stressed ruminants experience a negative energy balance, adipose tissue is not mobilized and there is an increase in insulin sensitivity. This suggests that glucose is the preferred energy source necessary to minimize the negative impact of heat stress in ruminants (Rhodes et al J. Dairy Sci. 92(5):1986-1997).

U.S. Pat. Nos. 7,303,775 and 6,322,827 discloses carbohydrate ruminant feed energy supplements and methods of use. However, the '775 patent invention uses fructose as an energy source, and the methodology to protect the energy source is based on "fat coating." As for the '827 patent, it the carbohydrate is chemically treated with formaldehyde to produce a protected carbohydrate.

U.S. Pat. Nos. 4,957,748, 5,789,001, and 6,221,380 discusses the use of Maillard reaction products, but as a method to produce ruminally inert lipids and proteins. Use of carbohydrates is limited to what is necessary to produce protected lipids and proteins. There remains a need for a product which includes a source of high quality rumen protected carbohydrates or blood glucose precursor for dairy animals, particularly during the transition period or during heat stress.

SUMMARY OF THE INVENTION

The present invention includes methods according to which the product of the present invention is made, as well as products made by the inventive method. When some foods are heat treated under moist conditions Maillard type reactions may occur. These reactions initially involve a condensation between the carbonyl group of a reducing sugar with the free amino group of an amino acid, protein or urea. The result is a Maillard reaction product. The present invention incorporates the discovery that the Maillard reaction can be employed to create rumen-protected carbohydrates that can be used as in a ruminant energy feed supplement.

According to one aspect of the present invention, a method of preparing a carbohydrate protected from ruminal degradation is provided in which a reducing carbohydrate source and a nitrogenous source are mixed, after which they are heated for a sufficient amount of time, at a sufficient temperature and pressure, in the presence of sufficient moisture so that a Maillard reaction product is formed. Products made by the method of the invention are also provided.

In another aspect of the present invention, a method of maintaining or restoring blood glucose levels within the normal reference range for ruminants is provided, in which effective amounts of a composition containing rumen-protected carbohydrates are administered. Administration is accomplished by mixing with other feeds, preferably grain concentrates. Ruminants weighing over 500 kg are typically fed between about 350 to about 2000 grams a day. Ruminants weighing between 100 kg and 500 kg are typically fed between about 250 to about 750 grams a day. Ruminants weighing under 100 kg are typically fed between about 50 to about 400 grams a day.

The foregoing and other aspects of the present invention will be better appreciated by reference to the following drawing and detailed description set forth below.

DETAILED DESCRIPTION OF THE INVENTION

Figure 1A:
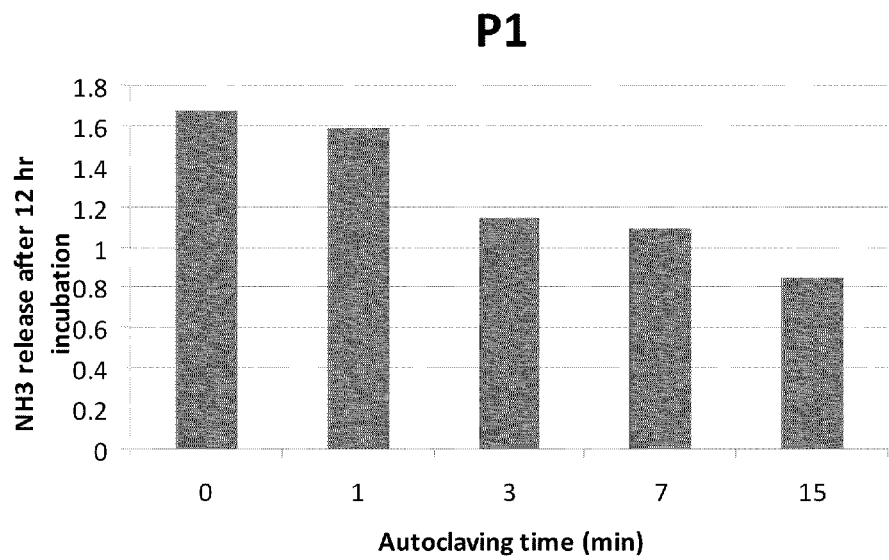
FIGS. 1A-1E are graphs illustrating ammonia concentrations in ruminal fluid after incubating ruminant feed supplements P1-P4 and PL in 250 ml ruminal fluid for 12 hours. Lower levels of ammonia released indicate more effective protection against rumen carbohydrate degradation.

The energy supplement components of the present invention can be dry fine powders or liquid. The energy supplement can be made by weighing and mixing together the component quantities with up to 25% by weight distilled water in any equipment suitable for mixing minerals. The mixture is then heated under pressure in an autoclave to between about 30 and about 200° C., preferably between about 90 and about 150° C., at a pressure between about 1.0 and about 2.0 Atm for about 30 seconds to about 48 hours, preferably between about one and about 30 minutes, and then chilled to room temperature. Most preferably, the mixture is heated to about 128° C. at between about 1.0 and about 1.5 Atm for about 7 minutes, and then chilled to room temperature. The reaction mixture will have a pH ranging between about 2 and about 10, preferably from about 6.0 to about 8.5.

A typical formulation is depicted in Table 1, together with the acceptable ranges within which individual components can be varied:

TABLE 1

| Ingredient | International feed number | Proportion ideal | (g/kg) range |
|---|---|---|---|
| 1. Dextrose | 6-02-633 | 360 | 100-700 |
| 2. Soya been meal | 5-12-820 | 600 | 0-700 |
| 3. Urea | 6-04-272 | 20 | 10-120 |
| 4. Na Bicarbonate | 6-04-272 | 35 | 0-50 |
| 5. $K_2HPO_4$ | 6-02-632 | 6 | 0-10 |
| 6. $KH_2PO_4$ | NA | 4.5 | 0-8 |
| 7. (OH)Na | NA | 10 | 0-20 |

The energy supplement of the present invention may also be optionally formulated with alternate carbohydrate sources in accordance with availability and pricing of ingredients. Fructose, sucrose, high fructose corn syrup, glucose, lactose, molasses, xylose, and spent sulfite liquor, and other reducing sugars can optionally be used as a carbohydrate source in the formulation.

Furthermore, the urea, which is a source of nitrogen, may be optionally substituted by glycine, peptone, casein hydrolysates, casein, methionine, and lysine in accordance with availability and pricing of ingredients.

In the event the supplement is prepared in a liquid media, resulting in a liquid product, the resulting liquid product can be dried on different matrixes, such as soybean meal, corn meal, silicates (verixite, vermiculite, etc.), rice hulls, mill run, ground corn, citrus pulp, oats hulls, sorghum grain, wheat mill run, and wheat midds.

Finally, NaOH may be used as an alternative to sodium bicarbonate, $K_2HPO_4$, and $KH_2PO_4$ as a buffer.

The energy supplement of the present invention may be conveniently fed to a ruminant admixed with a conventional ruminant feed. Feeds are typically vegetable materials edible by ruminants, such as grass silage, corn silage, legume silage, legume hay, grass hay, corn grain, oats, barley, distiller's grain, brewer's grain, soya bean meal, and cotton-seed meal. Concentrates or grains are preferred.

For ruminant animals weighing over 500 kg (e.g., young or adult cows), between about 350 and about 2000 grams a day of the energy supplement should be administered, preferably between about 750 and about 1250 grams, and more preferably about 1000 grams. For ruminant animals weighing between about 80 kg and about 300 kg (e.g., young or adult sheep), between about 250 and about 750 grams should be administered, preferably about 500 grams. For ruminant animals weighing under 150 kg (e.g., young or adult goats), between about 50 and about 400 grams should be administered, preferably about 200 grams. With ruminants under heat stress conditions the preferred dose of the product is between about 0.3 and about 2 kg of the product or more typically, between about 0.5 and about 1 kg of the product while they are experiencing heat stress conditions.

The energy supplements are intended to be fed to ruminant animals on a daily basis. Ruminants to which the compositions of the present invention may be fed include cows, goats, sheep, and the like. The period for administration to ruminant animals should be from about one month before calving up to the end of lactation. The preferred administration period for ruminant animals weighing over 500 kg is about one month before calving up to the end of lactation, and more preferably about 20 days before calving to about 30 days after calving. The preferred administration period for ruminant animals weighing between about 80 kg and about 300 kg is about 21 days before calving to the end of lactation, more preferably for about 14 days before calving until about 28 days afterwards. The preferred administration period for ruminant animals weighing under 150 kg is about 14 days before parturition up to the end of lactation, more preferably about 14 days before calving until about 21 days afterwards.

EXAMPLES

Example 1

Rumen Degradation Evaluation of Different Rumen Protected Carbohydrates by Measuring Ammonia Concentration in Batch Cultures The carbohydrate resistance to ruminal microbial fermentation was estimated indirectly by measuring the concentration of ammonia after incubating the different feed combinations with ruminal fluid in batch cultures (Cleale, J. Anim. Sci. 1987, 1312-1318). The different feed combinations tested are presented in Table 2.

TABLE 2

Composition of the Feed Combinations P1-P4 and PL (Dry Mass Basis)

| | P1 | P2 | P3 | P4 | PL* |
|---|---|---|---|---|---|
| Glucose | 33.96% | 66.69% | 35.06% | 44.47% | 33.61% |
| Soya Bean Meal | 56.60% | 17.53% | 58.44% | 44.47% | 56.02% |
| Urea | 5.24% | 11.54% | 2.16% | 7.11% | 6.22% |
| Buffer** | 4.19% | 4.23% | 4.33% | 3.95% | 4.15% |

*PL: is a liquid product made in liquid media and dried for 48 hours on soybean meal
**Buffer: 50% $CO_3HNa$, 20% $KH_2PO4$ and 30% $K_2H_2PO_4$ The ingredients of each feed combination P1 through P4 were mixed and homogenized, and then autoclaved at 128° C. and 1.5 Atm for 1, 3, 7 and 15 minutes. The preparation of PL consisted of autoclaving a mixture of urea, glucose, and the at 128° C. and 1.5 Atm for 1, 15 and 45 minutes. Afterwards, the liquid was mixed with soybean meal and dried for 48 hours at 60° C.

Ruminal contents were extracted from 2 fistulated steers eating a diet consisting of alfalfa hay. Ruminal fluid was obtained by filtering the rumen contents through 8 layers of cheese cloth. The fluid was mixed with artificial saliva (McDougall buffer) at a 50:50 v/v ratio. Temperature was maintained at 39° C. and $CO_2$ was used to keep the samples in an oxygen free environment.

Incubations of the different feed combinations were performed in 250 ml bottles. Each bottle had between 1 and 2 grams of a feed combination and was filled with 100 ml of the ruminal liquid and saliva. The bottles were then incubated for 12 hours in a water bath at 39° C. All feed combinations were incubated in duplicate. Controls, which were feed combinations that were not autoclaved, were also incubated for 12 hours in a water bath at 39° C. Incubations were terminated by injecting 10 ml of HCl 80% 16 N and 20% distilled water. The bottles were removed from the water bath and kept at 4° C. until they were centrifuged at 7,000 G. The supernatant was analyzed for ammonia concentration (see Broderick and Kang. J. Dairy Sci. 1980, 63:64).

Figure 1B:
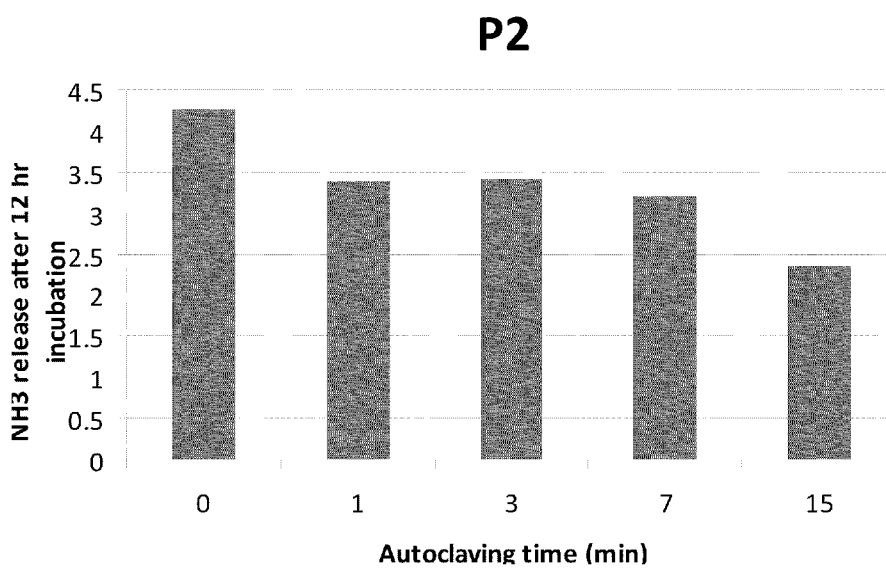
Figure 1C:
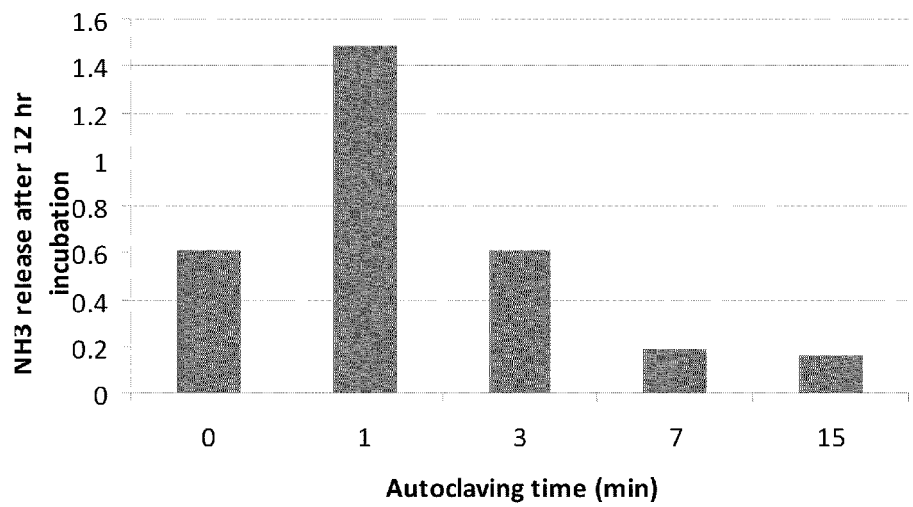
Figure 1D:
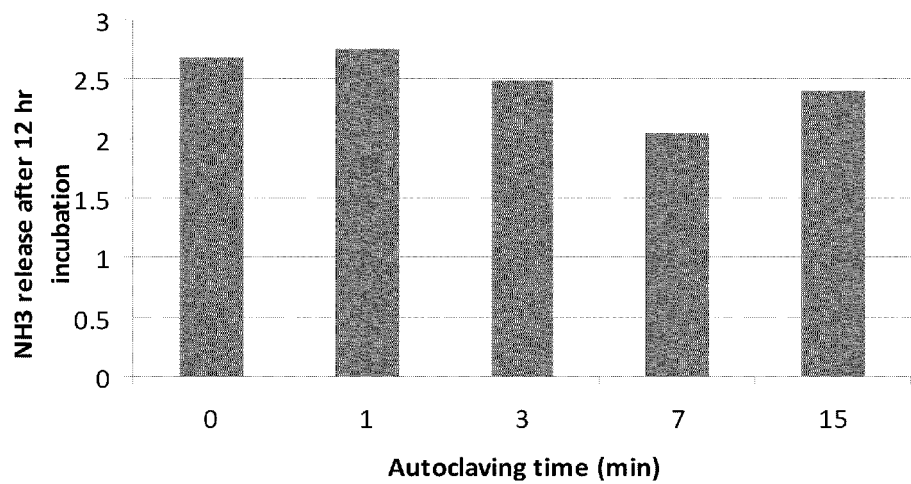
Figure 1E:
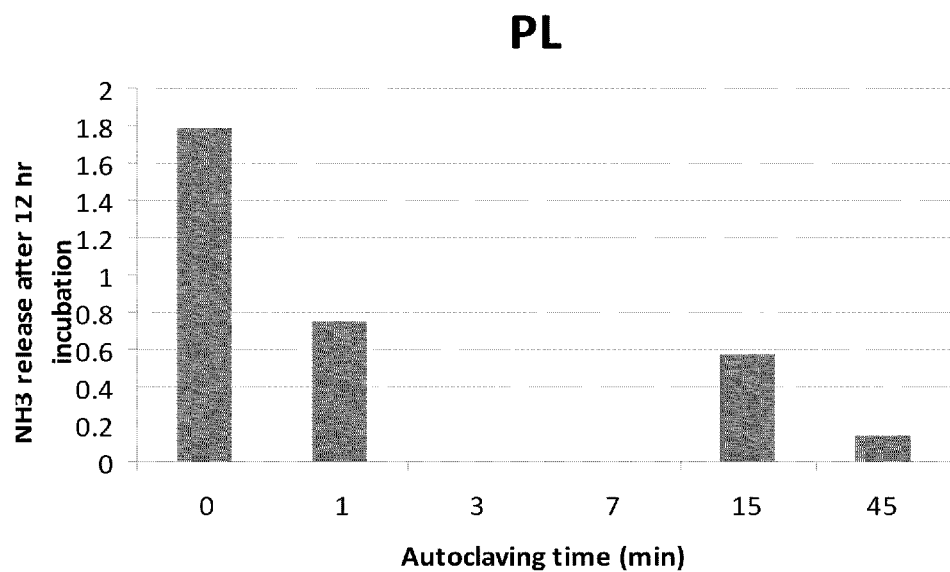

Results: P3 and PL are the carbohydrates based energy supplements that show less ammonia release at all temperatures, and consequently less microbial degradation in the ruminal fluid (FIG. 1).

Example 2

True Metabolizable Energy (TME) in Vivo Determination of Pre-Selected Rumen Protected Carbohydrates In order to determine how different manufacturing conditions may affect True Metabolizable Energy, the feed supplement combinations with the least microbial degradation in experiment 1, which are combinations P3 and PL, are tested according to the method as described by Sibald, I. R., Poultry. Sci. J. 1976 (55):303-308. The composition of the feed combinations are is shown in Table 1 (Example 1).

Thirty-five adult Leghorn Cocks were used in a completely randomized 2×3 factorial design with 5 repetitions. The cocks were fasted for 24 hours and placed in individual cages. Each cock received a mix of each test feed combination in a 50:50 w/w mix with water. The mix was fed into the beak of the bird using a syringe and a catheter. Total excreta of the cocks were collected 48 hours after feeding and were dried in an oven at 60° C. for 48 hours. The dried ex-creta was grounded and molded into a tablet. The tablet was then used to determine gross energy.

Test feed processing times are shown in Table 3 (Example 2).

TABLE 3

Description of time exposed to 128° C. and 1.5 Atm

| Product | Feed Combination | Time autoclaved |
|---------|------------------|-----------------|
| P3B | P3 | 0 minutes |
| P31 | P3 | 3 minutes |
| P32 | P3 | 7 minutes |
| PLB | PL | 0 minutes |
| PL1 | PL | 1 minutes |
| PL2 | PL | 45 minutes |

Results: The best True digestible energy is P31 for the solid mix and the PL1 for the liquid mix. Table 4, depicted below, shows the obtained results.

TABLE 4

True Metabolizable Energy (TME) evaluation of different feeds affected by different processing times

| Treatments | Dry Matter % | Gross Energy (GE) Kcal/kg | TME Kcal/kg | TME/GE % |
|------------|--------------|---------------------------|-------------|----------|
| PLB (Blank) | 79.87 | 4549 | 3188 | 70.1 |
| PL1 | 49.71 | 4601 | 2677 | 58.2 |
| PL2 | 44.58 | 4655 | 2573 | 55.3 |
| P3B (Blank) | 80.91 | 4531 | 3533 | 78 |
| P31 | 62.3 | 4584 | 3238 | 70.6 |
| P32 | 62.36 | 4658 | 3160 | 67.8 |

Example 3

Evaluation of Rumen Protected Carbohydrate Supplement During Early Lactation

In order to evaluate the impact of applying temperature and pressure in a buffered environment to a Rumen Protected Carbohydrate (RUPCA) mix with urea and solvent soybean meal fed to Holstein dairy cows for the first 28 days after calving.

Far-off dry cows were fed the same diet from 3 weeks before to the expected calving date. From calving to 28 days in milk (DIM), 27 multiparous Holstein dairy cows were assigned to three treatments in a complete randomized block design with covariance analysis to evaluate the effects of feeding the rumen protected carbohydrate on Dry Matter Intake (DMI), lactation performance (milk yield and composition), body weight (BW), body condition score (BCS), milk ketone bodies, and blood glucose.

The three treatments were based on 2 kg/cow/d of a mix consisting of carbohydrate, urea and solvent soybean meal (about 11% of total DMI). Cows in T0 received 2 kg of 100% non rumen protected carbohydrate. Cows in T1 and T2 were fed with the same amount as T0 cows, but 50% of supplement mix contained rumen protected carbohydrates (RUPCA) in T1, and 100% contained RUPCA in T2. The only dietary differences between treatments consisted on the supplied amount of RUPCA.

The cows from each treatments were assigned to different pens replicated twice with 5 and 4 cows each and group fed from one to 28 DIM. The DMI was estimated daily by dividing the total intake of each pen by the average DIM of the cows in the pen giving a total of 168 observations (28 days*3 treatments*2 repetitions), or 56 per treatment.

All dietary ingredients in the three treatments were identical, diets components (% DM) were: 31.4% corn silage, 19.4% alfalfa hay, 22.8% corn grain, 7.4% soybean seeds, 4% soybean meal, 6.3% solvent soybean meal, 4% carbohydrate, 0.4% urea and 4.3% minerals & vitamins. Diets were managed as total mixed rations (TMR), weekly samples of TMR were taken for nutrient contents.

Milk yield and composition per cow was measure two times per week on non-consecutive days (4 weeks*2 samples/week=8 data/cow). Body weight, BCS, and blood glucose were taken once a week. Milk yield per cow were compared in kg/cow/d and Mcal Net Energy in milk/cow/d. The Mcal EN in the milk was calculated based on milk components (fat, protein, and lactose contents) according to the NRC (2001).

The statistical analysis model included the fix effect of treatments, weeks, co-variables, and the random effects of cow determinations. Orthogonal contrasts were also used to evaluate treatments effects. Significance was declared at $P<0.05$ and tendencies were considered at $0.05<P<0.10$.

Results: The post-partum DMI from day 1 to day 28 were no different among treatments and averaged 19.0, 20.2, and 21.1 Kg DM/cow/day for T0, T1 and T2 respectively. The estimated mean diet nutrient composition was 50% DM, 16.1% CP, 33.8% NDF, 6.1% fat, and 7.5% ash. The results of milk yield, milk composition, BW, BCS, milk ketone bodies and glucose are presented in Table 5.

High SEM were observed for milk yield and BW changes. No differences were observed when milk yield was expressed in terms of total milk net energy output. Two variables related to fresh cows energy metabolism were affected by the treatments. Lactose milk content, which is supported by non-fat solids in milk and glucose concentration in blood were increased by RUPCA supplement. The values, including weekly estimations of body weight changes, suggest that carbohydrate in the RUPCA was protected against rumen degradation increasing the glucose supply to treated cows in T1 and T2.

TABLE 5

Effect of rumen protected carbohydrate supplement (RUPCA) on fresh lactation dairy cows performance.

| | Treatments LS Means | | | | P-values | Orthogonal contrasts | | |
| --- | --- | --- | --- | --- | --- | --- | --- | --- |
| | | | | | | T0vsT1 + T2/2 | T0vs T1 | T0vs T2 |
| Items | T0 | T1 | T2 | SEM | | P-values | | |
| Energy Corrected Milk (Mcal/cow/d) | 28.2 | 25.7 | 26.6 | 1.04 | ns | ns | ns | ns |
| Milk components | | | | | | | | |
| Fat, % | 4.08 | 4.06 | 4.15 | 0.17 | ns | ns | ns | ns |
| Protein, % | 3.36 | 3.47 | 3.48 | 0.07 | ns | ns | ns | ns |
| Lactose, % | 4.70 | 4.96 | 4.88 | 0.04 | 0.01 | 0.01 | 0.01 | 0.01 |
| Total solids, % | 12.8 | 13.2 | 13.3 | 0.20 | ns | ns | ns | ns |
| Non fat solids, % | 8.8 | 9.3 | 9.2 | 0.11 | 0.01 | 0.01 | 0.01 | 0.01 |
| Urea, mg/dl | 21.6 | 22.0 | 21.7 | 1.14 | ns | Ns | ns | ns |
| Blood | | | | | | | | |
| Glucose, mg/dl | 38.8 | 45.3 | 42.5 | 2.30 | ns | 0.07 | 0.05 | ns |
| Ketone bodies, mg/dl | 0.73 | 0.36 | 0.57 | 0.16 | ns | ns | ns | ns |
| BCS, scale 1 to 5 | 2.96 | 3.00 | 2.95 | 0.06 | ns | ns | ns | ns |
| BW, Kg | 648 | 678 | 662 | 26.4 | ns | ns | ns | ns |
| BW changes | | | | | | | | |
| Weeks 2 - 1, kg/week | −5.4 | −11.0 | −13.3 | 6.39 | ns | ns | ns | ns |
| Weeks 3 - 2, kg/week | — | −7.3 | −5.7 | 6.33 | ns | 0.08 | ns | 0.09 |
| Weeks 4 - 3, kg/week | −5.0 | −10.0 | −3.9 | 5.40 | ns | ns | ns | ns |
| Total, kg weeks one to 4 | −37.1 | −30.6 | −27.3 | 10.85 | ns | ns | ns | ns |

What is claimed is:

1. A method of preparing a carbohydrate protected from ruminal degradation comprising: mixing a reducing carbohydrate source and a non-protein nitrogen source, wherein the amount by weight of the reducing carbohydrate source is greater than the amount by weight of the non-protein nitrogen source; and heating the mixture for a sufficient amount of time, at a sufficient temperature and pressure, in the presence of sufficient moisture so that a Maillard reaction product is formed, wherein the amount of nitrogen source and the heating time, temperature, pressure and moisture conditions are sufficient to provide an amount of a Maillard reaction product effective to prevent ruminal degradation of said carbohydrate.

2. The method of claim 1, wherein the non-protein nitrogen source is selected from the group consisting of urea, glycine, methionine, and lysine.

3. The method of claim 1, wherein the reducing carbohydrate source is selected from the group consisting of fructose, sucrose, dextrose, high fructose corn syrup, glucose, lactose, molasses, xylose, and spent sulfite liquor.

4. The method of claim 1, wherein the mixture is heated to a temperature between about 30° C. and about 200° C. at a pressure between about 1.0 Atm and about 2.0 Atm for about 30 seconds to about 48 hours.

5. The method of claim 1, wherein the mixture is heated to a temperature between about 90° C. and about 150° C. at a pressure between about 1.0 Atm and about 1.5 Atm for about 1 minute to about 30 minutes.

6. The method of claim 1, wherein the mixture is heated to a temperature between about 128° C. at a pressure between about 1.0 Atm and about 1.5 Atm for about 7 minutes.

7. An energy supplement for use in ruminant feed comprising rumen protected carbohydrates prepared by the method according to claim 1.

8. The energy supplement of claim 7, wherein the rumen protected carbohydrate is a liquid product dried onto a matrix.

9. The energy supplement of claim 8, wherein the matrix is selected from the group consisting of soybean meal, corn meal, silicates, rice hulls, mill run, ground corn, citrus pulp, oats hulls, sorghum grain, wheat mill run, and wheat midds.

10. A method for maintaining or restoring blood glucose levels within the normal reference range for ruminants, comprising feeding an effective amount of the energy supplement of claim 7.

11. The method of claim 10, wherein said energy supplement is fed daily.

12. The method of claim 10, wherein said energy supplement is fed to a female ruminant in transition or under heat stress.

13. The method of claim 10, wherein said ruminant animal is a mature ruminant during transition weighing at least 500 kg and is fed between about 350 and 2000 grams of said energy supplement from about one month before calving up to the end of lactation.

14. The method of claim 10, wherein said ruminant animal is a mature ruminant during transition weighing between about 80 kg and about 300 kg and is fed between about 250 to 750 grams of said energy supplement from about 21 days before calving up to the end of lactation.

15. The method of claim 10, wherein said ruminant animal is a mature ruminant during transition weighing less than 150 kg and is fed between 50 and 400 grams of said energy supplement from about 14 days before calving up to the end of lactation.

16. The method of claim 10, wherein the ruminant is suffering from heat-stress.

17. The method of claim 10, wherein said ruminant is a cow, goat or sheep.

18. The method of claim 10, wherein said ruminant animal is a mature ruminant under heat stress weighing at least 500 kg and is fed between about 350 and 2000 grams of said energy supplement per day.

19. The method of claim 10, wherein said ruminant animal is a mature ruminant under heat stress weighing between about 80 kg and about 300 kg and is fed between about 250 to 750 grams of said energy supplement per day.

20. The method of claim 10, wherein said ruminant animal is a mature ruminant under heat stress weighing less than 150 kg and is fed between 50 and 400 grams of said energy supplement per day.

* * * * *